United States Patent
Bhatia et al.

(10) Patent No.: US 7,881,017 B2
(45) Date of Patent: Feb. 1, 2011

(54) FLY HEIGHT CONTROL APPARATUS AND ELECTRICAL COUPLING THERETO FOR SUPPORTING A MAGNETIC RECORDING TRANSDUCER

(75) Inventors: Charanjit Bhatia, San Jose, CA (US); Yoshiki Midori, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 774 days.

(21) Appl. No.: 11/646,772

(22) Filed: Dec. 27, 2006

(65) Prior Publication Data
US 2008/0158713 A1  Jul. 3, 2008

(51) Int. Cl.
*G11B 5/56* (2006.01)
(52) U.S. Cl. ............... 360/294.7; 360/234.5
(58) Field of Classification Search ... 360/234.3–237.1, 360/294.7
See application file for complete search history.

(56) References Cited

U.S. PATENT DOCUMENTS

| | | | |
|---|---|---|---|
| 5,331,489 A | 7/1994 | Johnson et al. | |
| 6,381,104 B1 * | 4/2002 | Soeno et al. | 360/294.4 |
| 6,435,016 B1 | 8/2002 | Smith et al. | |
| 6,580,687 B1 | 6/2003 | Cumpson et al. | |
| 6,690,543 B2 * | 2/2004 | Kurita et al. | 360/234.7 |
| 6,738,231 B2 | 5/2004 | Arya et al. | |
| 6,785,096 B2 | 8/2004 | Kuwajima et al. | |
| 6,798,605 B2 * | 9/2004 | Kurita et al. | 360/75 |
| 6,833,978 B2 | 12/2004 | Shum et al. | |
| 6,950,266 B1 | 9/2005 | McCaslin et al. | |
| 6,987,649 B2 | 1/2006 | Nakagawa | |
| 2002/0097663 A1 | 7/2002 | O'Neill | |
| 2002/0191342 A1 | 12/2002 | Yanagisawa | |
| 2003/0231434 A1 | 12/2003 | Mita et al. | |
| 2005/0013057 A1 | 1/2005 | Kurita et al. | |
| 2005/0168107 A1 | 8/2005 | Hida et al. | |
| 2005/0195531 A1 | 9/2005 | Yamazaki et al. | |

\* cited by examiner

*Primary Examiner*—A. J. Heinz

(57) ABSTRACT

A fly height control apparatus for supporting a magnetic recording transducer comprises a trifurcated slider. A piezoelectric transducer is coupled to a surface of the central trifurcation of the trifurcated slider. The surface is opposite and parallel to an air bearing surface of the trifurcated slider. An electrical coupling means couples the piezoelectric transducer to a suspension.

7 Claims, 11 Drawing Sheets

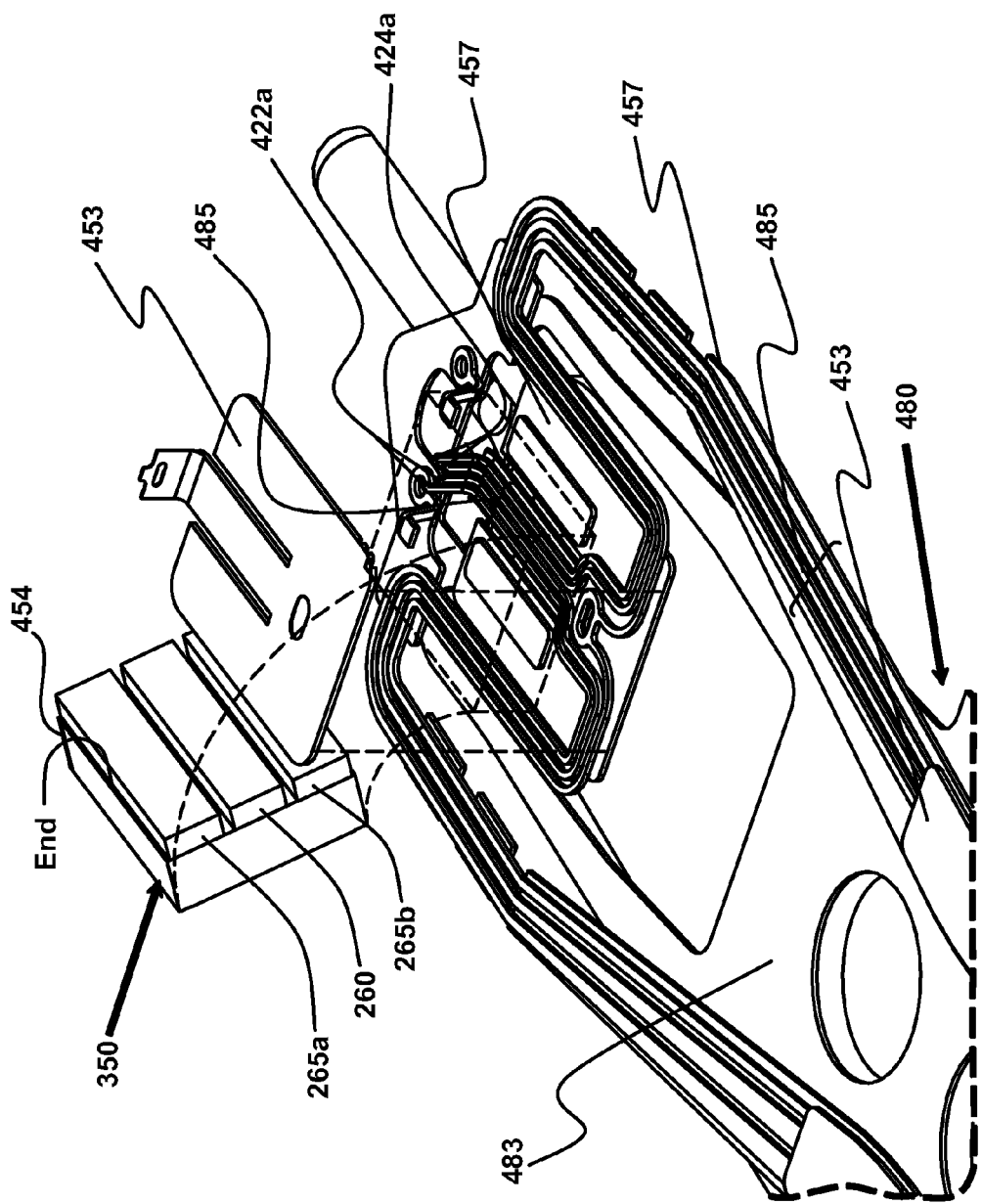

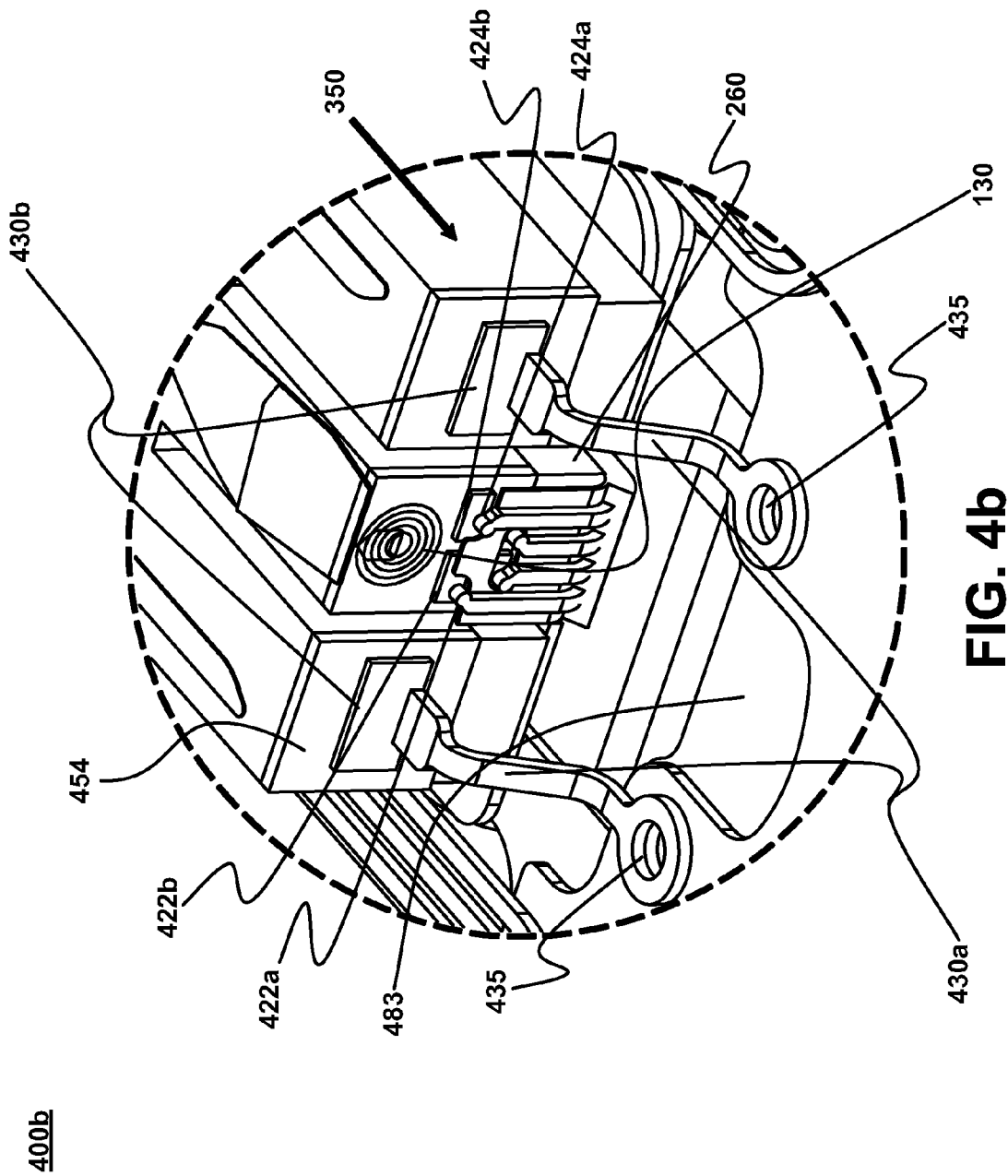

FLY HEIGHT CONTROL APPARATUS AND ELECTRICAL COUPLING THERETO FOR SUPPORTING A MAGNETIC RECORDING TRANSDUCER

TECHNICAL FIELD

This invention relates generally to the field of direct access storage devices and in particular to the electrical termination of a vertically actuated slider whereby actuation is achieved by means of a piezoelectric device.

BACKGROUND ART

Direct access storage devices (DASD) have become part of every day life, and as such, expectations and demands continually increase for greater speed for manipulating and holding larger amounts of data. To meet these demands for increased performance, the mechano-electrical assembly in a DASD device, specifically the Hard Disk Drive (HDD) has evolved to meet these demands.

In order for an HDD to hold more data, the magnetic recording heads as well as the disk media on which the data is written have undergone major advances in the past few years. A critical relationship between the head and disk is the spacing between their adjacent surfaces. This is typically known as the fly height.

The head flies above the disk by virtue of an air film created by the disk spinning next to a pattern on the surface of the slider (and magnetic recording transducer contained there within). This pattern on the slider is known as the Air Bearing Surface, or ABS. The ABS is fabricated on the surface of the slider that is closest to the disk. Typically the closest point on the ABS to the adjacent disk surface resides on the magnetic recording head. Typically the head resides at the end of the slider known as the trailing edge of the slider, so called the trailing edge because it is the last edge of the slider to fly over the disk. Once the slider is coupled to a suspension device the assembly is referred to as a Head Gimbal Assembly, or HGA. Other components such as a load beam, mount plate, and damper, which are well known to one skilled in the art, may also be coupled to the suspension and the assembly may still be referred to as an HGA.

Control of the fly height is critical to the density of data that can be written onto the disk surface. Fly height today is in the range of 5-15 nm. If heads fly too high, data might not be transferred to and from the disk with adequate amplitude, or signal strength. If heads fly too low, there exists the potential for catastrophic failure known as head crash. As the name implies, head crash is that situation which can occur when the head makes contact with the disk. This can result in either damage to the head, or to the disk, or to both. A head crash can result in loss of data and/or rendering the HDD inoperable.

The demand for more data storage is requiring the slider to operate with an ever-decreasing fly height and fly height tolerance. The margin has decreased for flying too high and having inadequate signal amplitude or flying too low and jeopardizing a head crash. This presents fly height control challenges.

As with any manufactured assembly, there are many tolerances and dimensions that affect the fly height of the head above the disk. One solution is to tightening the tolerances and distributions of those features of all components that effect fly height. However, many of the tolerances are associated with components that support the head or the disk and are very difficult and costly to control for the head manufacturer or disk manufacturer. Moreover, in many cases it is possible to have each distinct component that affects fly height in an HDD meet its individual dimension and tolerance, but when assembled with other components the resulting fly height of one or more sliders is unacceptable due to the interaction of tolerances. Conversely, many components scrapped for failing to meet the component specifications, may not fail the final HDD test if the components are properly matched during assembly. Therefore, screening components based on component specifications in most cases is very costly and may not be very effective.

There exists in the HDD industry a fly height control method whereby the magnetic recording transducer is urged closer to the disk recording media by means of a heating device imbedded in the slider. As the heating device is energized the material that surrounds the magnetic recording transducer expands and distends the magnetic recording device beyond the plane of the ABS. This fly height control method and apparatus is typically known as Thermal Flyheight Control, or TFC.

There are several disadvantages to TFC. The amount of displacement produced by TFC is small. TFC cannot absorb large deviations from the desired fly height. The reaction time for TFC is relatively slow. TFC relies upon the thermal expansion of the material that contains the magnetic recording transducer and therefore only distends the magnetic recording transducer once the surrounding material has become sufficiently warm. TFC only distends the magnetic recording transducer. It typically cannot retract the magnetic recording transducer beyond its initial relative position to the plane of the ABS. It would be advantageous to have a fly height control apparatus that addressed these disadvantages and limitations.

SUMMARY OF THE INVENTION

Various embodiments of the present invention are described herein. A fly height control apparatus for supporting a magnetic recording transducer comprises a trifurcated slider. A piezoelectric transducer is coupled to a surface of the central trifurcation of the trifurcated slider. The surface is opposite and parallel to an air bearing surface of the trifurcated slider. An electrical coupling means couples the piezoelectric transducer to a suspension.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4a is an isometric blow-apart detail of an HGA in accordance with one embodiment of the present invention.

FIG. 4b is an isometric detail of an HGA in accordance with one embodiment of the present invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The overview will discuss those features of the present invention that are similar to all the embodiments of the invention. The discussion will then focus on embodiments of the invention that allow coupling of a fly height control apparatus to a suspension. Finally, a method of fabricating an HGA, which allows coupling of a fly height control apparatus to a suspension will be discussed in accordance with the embodiments of the present invention.

Overview

Figure 1:
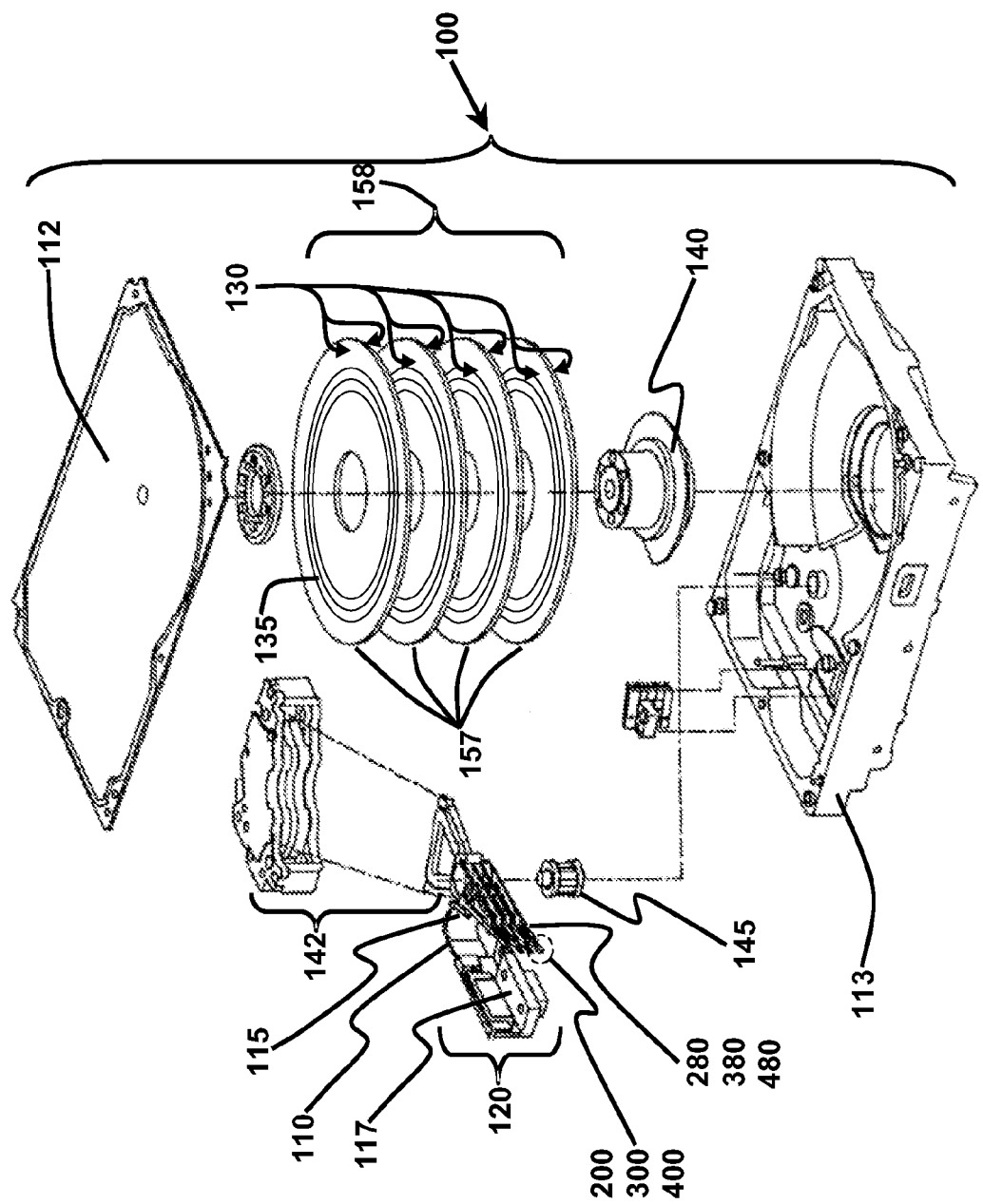
FIG. 1 is an isometric blow-apart of an HDD in accordance with one embodiment of the present invention.

With reference to FIG. 1, an isometric blow-apart of HDD 100 is shown in accordance with an embodiment of this invention. Base casting 113 provides coupling points for components and sub-assemblies such as disk stack 158, voice coil motor (VCM) 142, and actuator assembly 120. Disk stack 158 is coupled to base casting 113 by means of motor-hub assembly 140. Motor hub assembly 140 will have at least one disk 157 coupled to it whereby disk 157 can rotate about an axis approximately perpendicular and common to motor-hub assembly 140 and the center of disk 157. Disk 157 has at least one surface 130 upon which reside data tracks 135.

Figure 2:
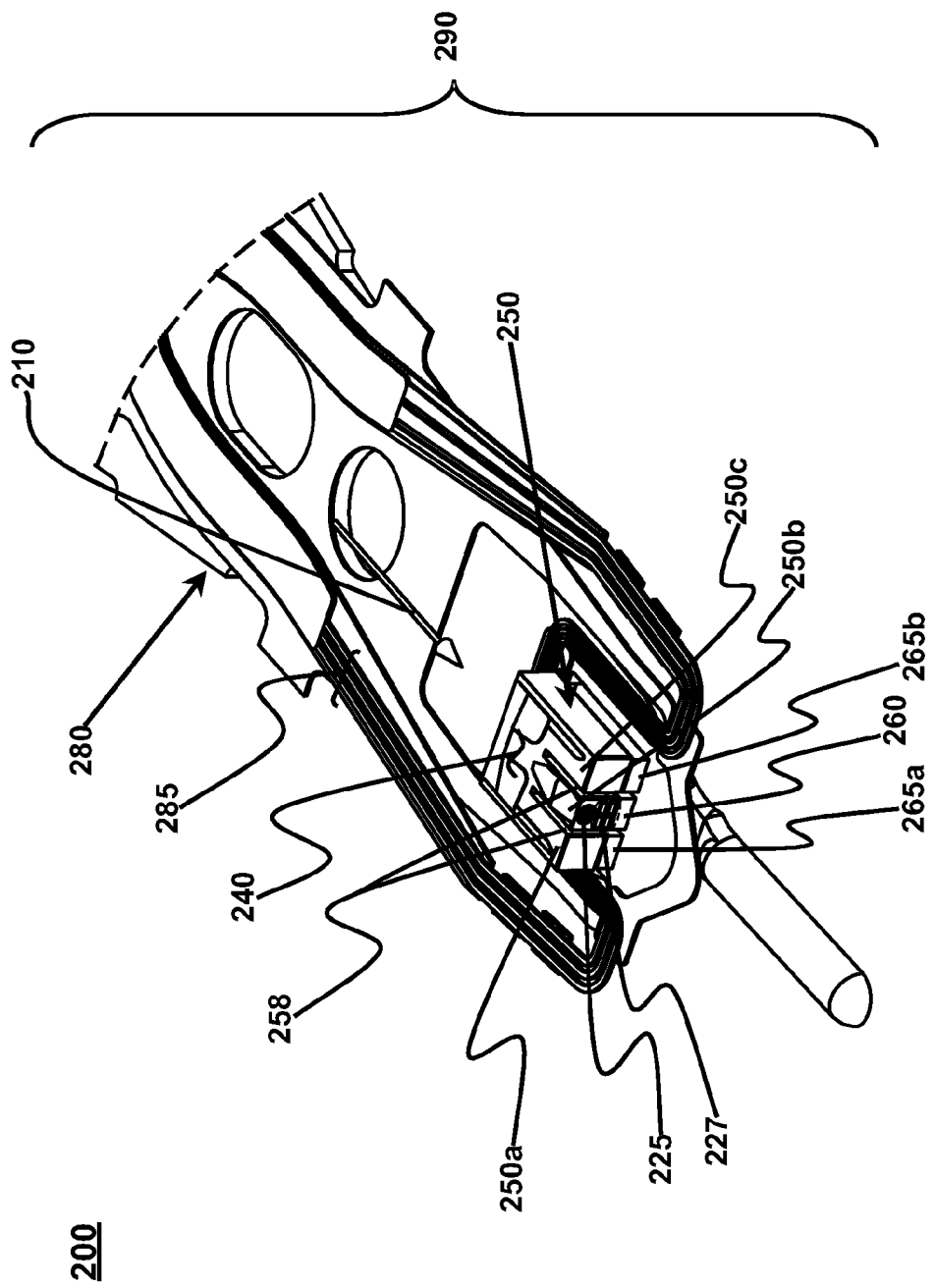
FIG. 2 is an isometric detail of an HGA in accordance with one embodiment of the present invention.
Figure 3:
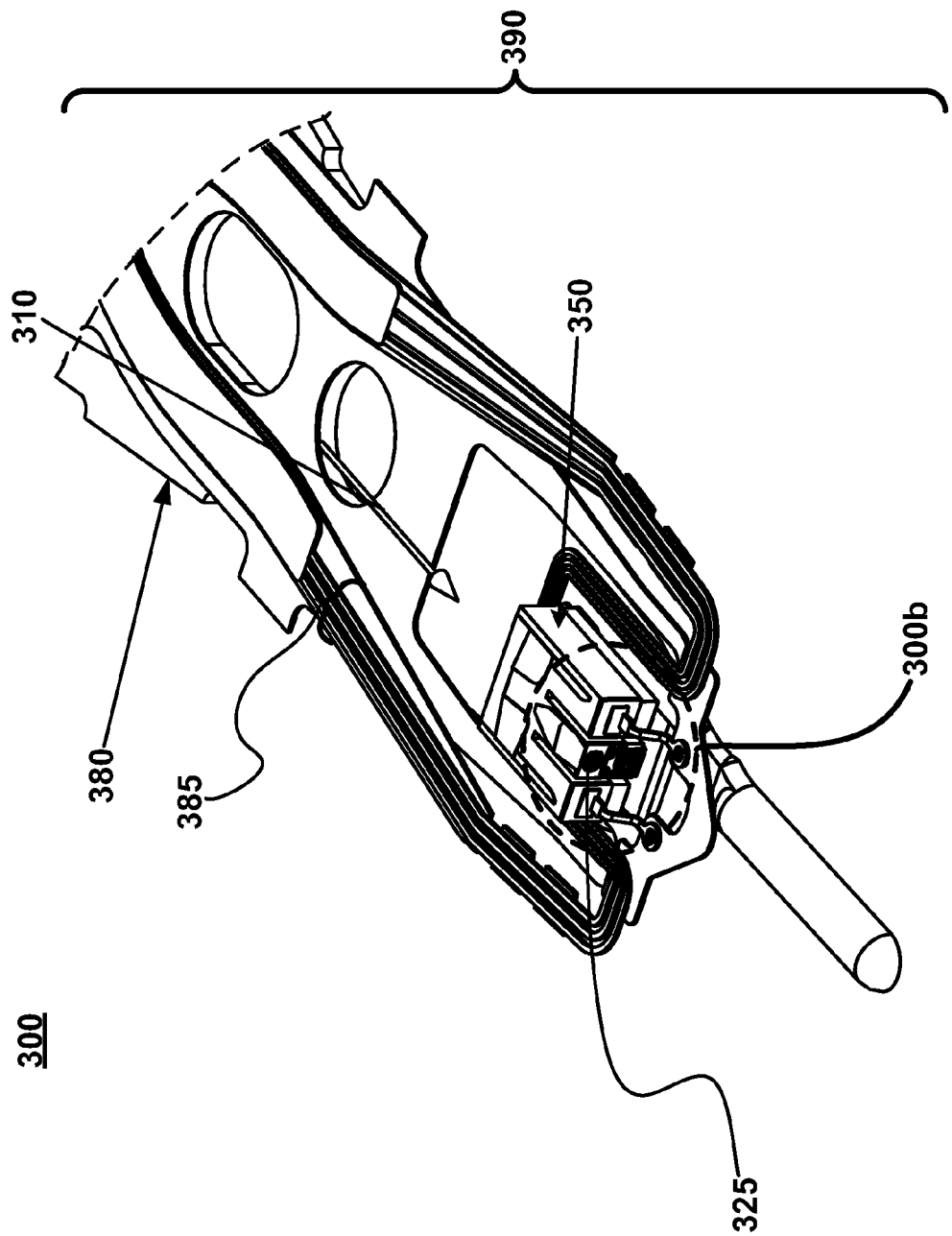
FIG. 3 is an isometric detail of an HGA in accordance with one embodiment of the present invention.
Figure 4:
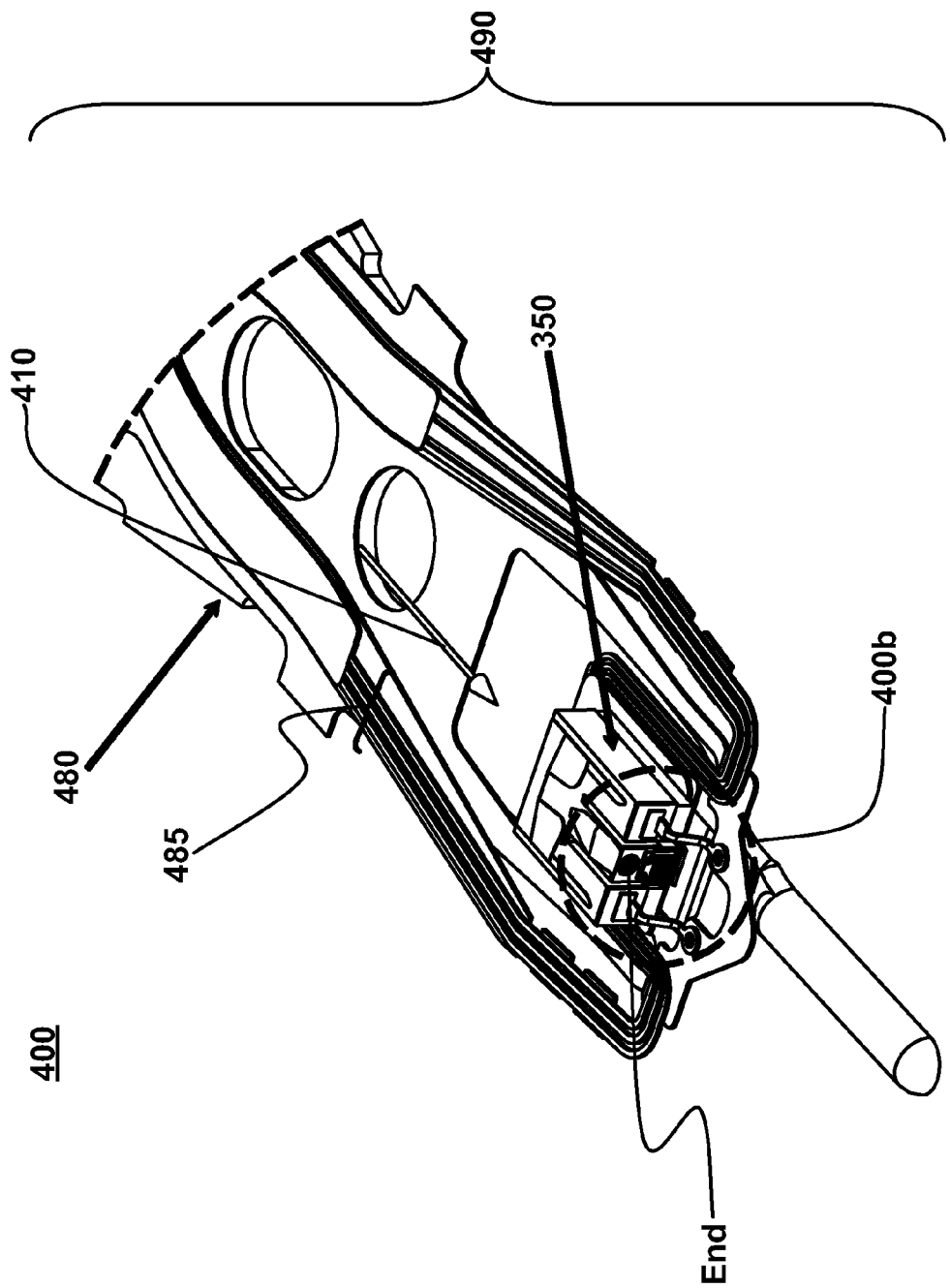
FIG. 4 is an isometric detail of an HGA in accordance with one embodiment of the present invention.

With additional reference to FIGS. 2, 3, and 4, three distinct embodiments of the present invention are presented in details 200, 300, and 400. For the sake of brevity and clarity, the following discussion will be referenced to the features of detail 200, but will apply to similar features of all three embodiments.

Actuator assembly 120 comprises in part connector 117, which conveys data between arm electronics (A/E) 115 and a host system wherein HDD 100 resides. Flex cable 110, which is part of actuator assembly 120, conveys data between connector 117 and A/E 115. A/E 115 performs the electronic functions of actuator assembly 120 such as, switching between reading and writing functions of magnetic recording transducer 225. A/E 115 amplifies the read data when magnetic recording transducer 225 reads data tracks 135. A/E 115 provides current to magnetic recording transducer 225 for writing data tracks 135. Also part of actuator assembly 120 is HGA 290. Suspension 280 comprises in part suspension conductor 285, which convey data signals between magnetic recording transducer 225 and A/E 115.

Actuator assembly 120 is coupled pivotally to base casting 113 by means of pivot bearing 145, whereby VCM 142 can move magnetic recording transducer 225 arcuately across data tracks 135. Upon assembly of actuator assembly 120, disk stack 158, VCM 142, and other components with base casting 113, cover 112 is coupled to base casting 113 to enclose these components and sub-assemblies into HDD 100.

With reference to FIGS. 2, 3, and 4 details 200, 300, and 400 are the most distal end of HGAs 290, 390, and 490. For the sake of brevity and clarity those features that are similar to HGAs 290, 390, and 490 are presented in reference to HGA 290 but are to be understood to have similar features in HGA 390 and HGA 490.

In accordance with an embodiment of the present invention, HGA 290 comprises in part suspension 280; trifurcated slider 250; piezoelectric transducer (PZT) 260; an electrical coupling means; and any other components that may be attached to suspension 280. Trifurcated slider 250 comprises in part magnetic recording transducer 225, read/write termination pads 227, slots 258, and ABS 240. Slots 258 divide trifurcated slider 250 into three trifurcations of approximately equal length, width, and height. Trifurcation 250*b* comprises in part magnetic transducer 225 and read/write termination pads 227. Trifurcation 250*b* is located between trifurcation 250*a* and trifurcation 250*c*. PZT 260 is located between suspension 280 and trifurcated slider 250. PZT 260 is coupled to the surface of trifurcation 250*b* that is opposite and parallel to ABS 240. A surface that is opposite and parallel to the ABS of the trifurcated slider will from hereon be referred to as the backside of the trifurcated slider.

In general, a well-known application for PZTs in the electronics industry is in small audio devices. PZTs are ideal for this application due to their fast response time, which is required for producing audio transmissions. PZTs are also compact in size. These characteristics make PZTs ideally suited for application in a fly height control apparatus wherein they can provide fast response time to perturbations in fly height of the slider.

Depending on the configuration, PZTs can provide an approximate range of plus one micron to minus one micron displacement. This can allow a wide range of control for compensating for variations in fly height of the slider.

Physical Description

Various electrical coupling means for coupling PZT 260 to suspension 280 will be presented in accordance with embodiments of the present invention. A fly height control apparatus in embodiments of the present invention comprises the coupling of trifurcated slider 250 to PZT 260, and PZT 260 to suspension 280

Figure 2A:
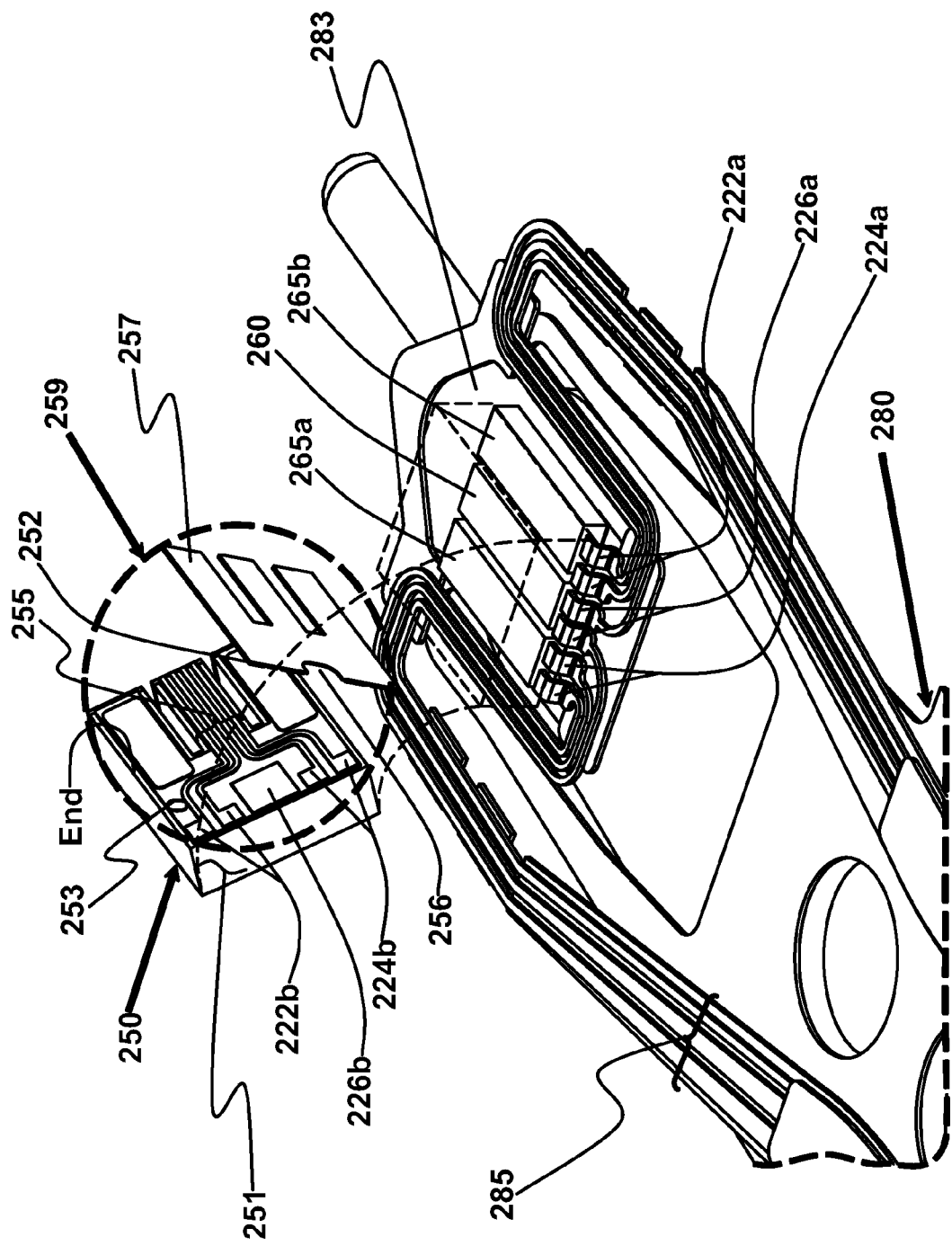
FIG. 2a is an isometric blow-apart detail of an HGA in accordance with one embodiment of the present invention.

FIG. 2*a* is an isometric blow-apart detail of HGA 290. FIG. 2*a* is aligned to line of sight 210 in detail 200 of FIG. 2. In accordance with an embodiment of the present invention, an electrical coupling means comprises monolithic circuit 259 integrated on a surface of slider 250. Monolithic circuit 259 typically comprises insulator 253, which generally isolates conductors 255 electrically from trifurcated slider 250. Insulator 257 generally isolates conductors 255 electrically from PZT 260 and spacers 265*a* and 265*b*.

PZT 260 and spacers 265*a* and 265*b* are typically fabricated from the same PZT material. However, by electrically isolating spacers 265*a* and 265*b* from monolithic circuit 259, spacers 265*a* and 265*b* will not produce any displacement, as PZT 260 will when it is energized.

In a typical monolithic circuit, all layers are deposited in a series of operations, which typically make these fabricated layers inseparable. For clarity, insulator 257 is shown separate and removed from monolithic circuit 259 so that viewing of conductors 255 is possible.

In accordance with an embodiment of the present invention monolithic circuit 259, is deposited on backside 254 of trifurcated slider 250. Monolithic circuit 259 comprises termination pads 222b, 224b, and 226b, whose terminus is at the leading edge of slider 250. In another embodiment of the present invention monolithic circuit 259 continues onto orthogonal surface 251, thus presenting termination pads 222b, 224b, and 226b on orthogonal surface 251.

With reference to FIG. 3 and detail 300, and in accordance with an embodiment of the present invention, an electrical coupling means comprises an interposing interconnect apparatus 359 (FIG. 3a), which is fabricated as a separate component independent of suspension 380 and trifurcated slider 350.

Figure 3A:
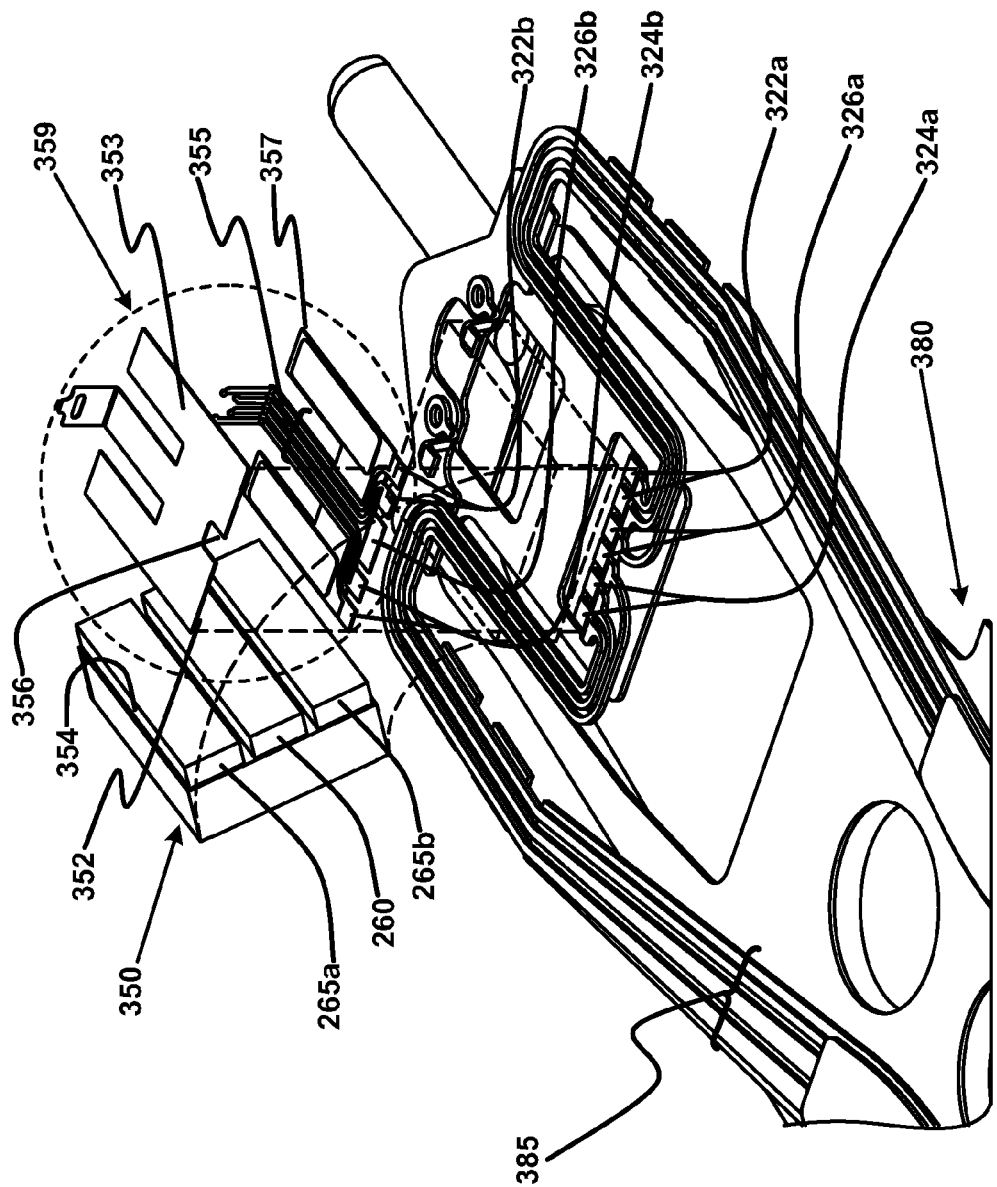
FIG. 3a is an isometric blow-apart detail of an HGA in accordance with one embodiment of the present invention.

FIG. 3a is an isometric blow-apart detail of HGA 390. FIG. 3a is aligned to line of sight 310 in detail 300 of FIG. 3. In accordance with an embodiment of the present invention, an electrical coupling means comprises an interposing interconnection apparatus 359. Interposing interconnection apparatus 359 typically comprises insulator 353, which generally isolates conductors 355 electrically from PZT 260 and spacers 265a and 265b.

PZT 260 and spacers 265a and 265b are typically fabricated from the same PZT material. However, by electrically isolating spacers 265a and 265b from conductors 355, spacers 265a and 265b will not produce any displacement, as PZT 260 will when it is energized.

Insulator 357 generally isolates conductors 355 electrically from PZT 260. In a typical interposing interconnection apparatus, all layers are fabricated in a series of operations, which typically make these fabricated layers inseparable. For clarity, insulator 353 is shown separate and removed from interposing interconnection apparatus 359 so that viewing of conductors 355 is possible. In accordance with an embodiment of the present invention interposing interconnection apparatus 359 is coupled between PZT 260 and suspension 380.

With reference to detail 400 of FIG. 4, and in accordance with an embodiment of the present invention, an electrical coupling means comprises suspension conductor 485, which are fabricated as part of suspension 480.

FIG. 4a is an isometric blow-apart detail of HGA 490. FIG. 4a is aligned to line of sight 410 in detail 400 of FIG. 4. In accordance with an embodiment of the present invention, an electrical coupling means comprises suspension conductor 485. One schooled in the art will realize that suspension conductor 485 can be provided by a variety of suspension technologies for fabricating conductors with a suspension. For the purpose of brevity and clarity, Integrated Lead Suspension (ILS) technology is presented in FIGS. 4, 4a, and 4b. Other technologies for providing conductors with a suspension, such as Circuit Integrated Suspension (CIS) technology and Flex on Suspension (FOS) technology may also be used. Reference to ILS will also infer reference to other suspension technologies whereby the conductors are provided with the suspension.

Suspension conductor 485 is typically isolated electrically from suspension base material 483 of suspension 480 by insulator 457. Typically suspension base material 483 comprises an electrically conductive material such as stainless steel. Insulator 453 generally isolates suspension conductor 485 electrically from PZT 260 and spacers 265a and 265b.

PZT 260 and spacers 265a and 265b are typically fabricated from the same PZT material. However, by electrically isolating spacers 265a and 265b from suspension conductor 485, spacers 265a and 265b will not produce any displacement, as PZT 260 will when it is energized.

Typically with ILS, all layers are fabricated in a series of operations, which typically make these fabricated layers inseparable. For clarity, insulator 453 is shown separate and removed from suspension conductor 485 so that viewing of suspension conductor 485 is possible. In accordance with an embodiment of the present invention, suspension conductor 485 is coupled between PZT 260 and suspension base material 483 of suspension 480.

Operation

In reference to the embodiments of the present invention, the function of a fly height control apparatus is to urge a magnetic recording transducer out of the plane of an ABS of a trifurcated slider whereby the magnetic recording transducer can be brought closer to or further from a disk surface. The various embodiments of the present invention teach electrical coupling means that may be used to established a voltage potential on a surface of a PZT, such as, for example one or more surfaces of a PZT which are opposite and parallel to the ABS. In various embodiments, the PZT is coupled between backside of the trifurcated slider, and a suspension. Energizing the PZT of the fly height control apparatus urges the central trifurcation of the trifurcated slider out of the plane of the ABS. The central trifurcation of the trifurcated slider comprises the magnetic transducer.

With reference now to FIG. 2a and in accordance with an embodiment of the present invention, conductors 255 of monolithic circuit 259 are electrically coupled to read/write termination pads 227 (detail 200 of FIG. 2). Read/write termination pads 227 allow testing of magnetic recording transducer 225 prior to the fabrication of monolithic circuit 259. Conductors internal to magnetic recording transducer 225 and read/write termination pads 227 are exposed for electrical coupling to monolithic circuit 259 upon the fabrication of that surface of trifurcation 250b, which is opposite and parallel to ABS 240.

Conductors 255 electrically couple magnetic recording transducer 225 (detail 200 of FIG. 2) to a terminus towards the leading edge of trifurcated slider 250 whereat termination pads 222b and termination pads 224b reside. Termination pads 222b typically electrically couple the write portion of magnetic recording transducer 225 to termination pads 222a of suspension conductor 285, and termination pads 224b typically electrically couple the read portion of magnetic recording transducer 225 to termination pads 224a of suspension conductor 285. Edge 252 of insulator 257 is aligned to the edge of termination pads 222b and termination pads 224b such that termination pads 222b and termination pads 224b are exposed for allowing electrical coupling with termination pads 222a and termination pads 224a.

In accordance with an embodiment of the present invention, termination pad 226b overlaps termination pad 226a of suspension conductor 285 as well as a surface on PZT 260. Notch 256 in edge 252 of insulator 257 allows simultaneous electrical coupling of termination pad 226b to a surface on PZT 260 and termination pad 226a. PZT 260 is electrically coupled to base material 283 of suspension 280. Typically electrical coupling can be achieved by using a variety of conductive adhesives well known in the industry. Hence by electrically coupling PZT 260 at termination pad 226a and at base material 283, a voltage potential can be established for controlling the function of a fly height control apparatus.

With reference now to FIG. 3a and in accordance with another embodiment of the present invention, conductors 355 of interposing interconnection apparatus 359 are electrically coupled to read/write termination pads 327.

Conductors 355 electrically couple magnetic recording transducer 325 (detail 300 of FIG. 3) to a terminus towards the leading edge of trifurcated slider 350 whereat termination pads 322b and termination pads 324b reside. Termination pads 322b typically electrically couple the write portion of magnetic recording transducer 325 to termination pads 322a of suspension conductor 385, and termination pads 324b typically electrically couple the read portion of magnetic recording transducer 325 to termination pads 324a of suspension conductor 385. Edge 352 of insulator 357 is aligned to the edge of termination pads 322b and termination pads 324b such that termination pads 322b and termination pads 324b are exposed for allowing electrical coupling with termination pads 322a and termination pads 324a.

In accordance with an embodiment of the present invention, termination pad 326b overlaps termination pad 326a of suspension conductor 385 as well as a surface on PZT 260. Notch 356 in edge 352 of insulator 353 allows simultaneous electrical coupling of termination pad 326b to a surface on PZT 260 and termination pad 326a, of suspension conductor 385.

Figure 3B:
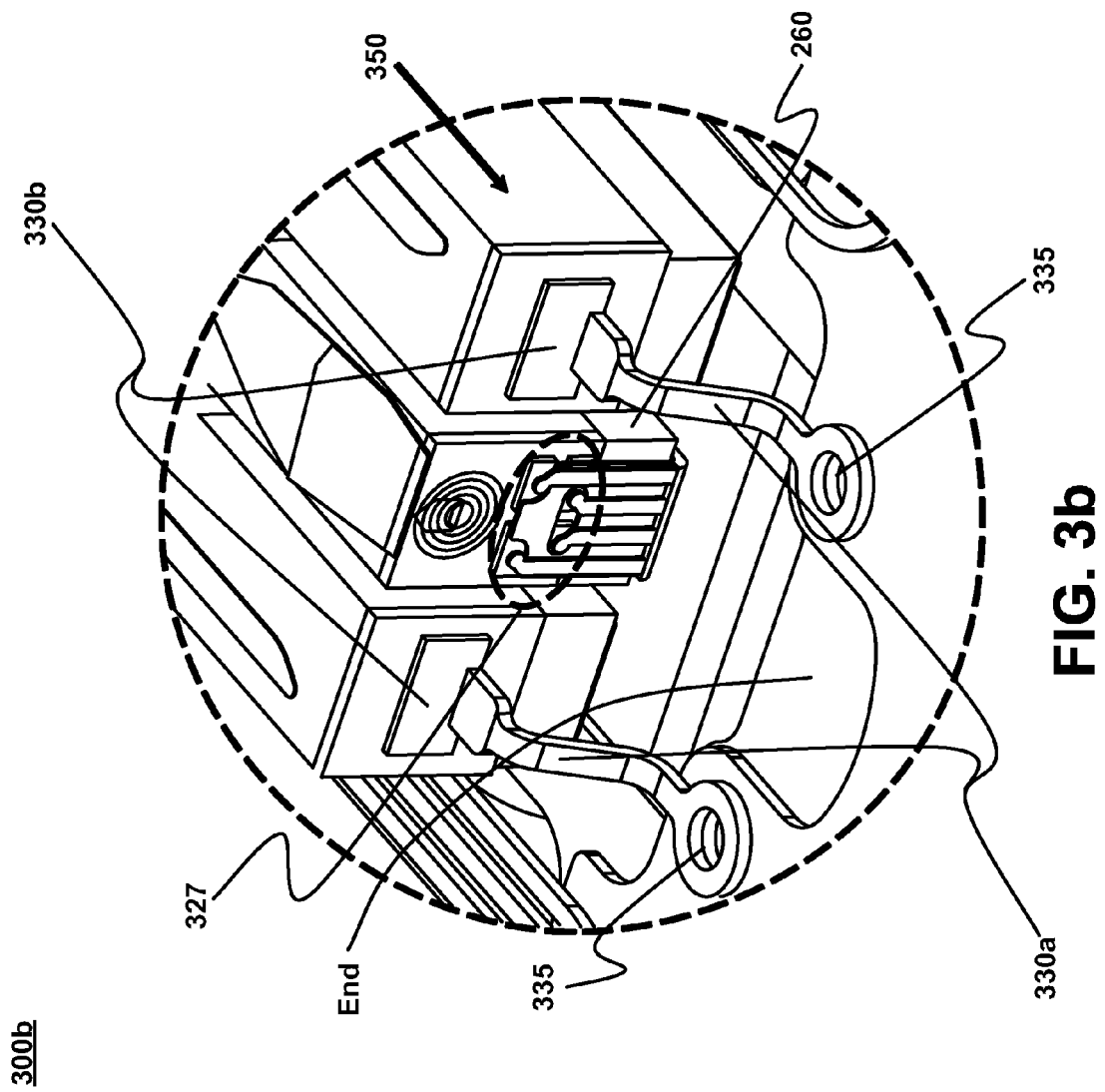
FIG. 3b is an isometric detail of an HGA in accordance with one embodiment of the present invention.

With reference to detail 300b of FIG. 3b and in accordance with an embodiment of the present invention, PZT 260 is electrically coupled to suspension base material 383. Termination pad 330a is electrically coupled at location 335 to suspension base material 383 using art such as that taught in U.S. Pat. No. 6,700,748. Termination pad 330b is electrically coupled to PZT 260 via an internal conductor that is coupled to backside 354 of trifurcated slider 350. Typically electrical coupling from backside 354 of trifurcated slider 350 to PZT 260 can be achieved by using a variety of conductive adhesives well known in the industry. Hence by electrically coupling PZT 260 at termination pad 326a and at base material 383, a voltage potential can be established for controlling the function of a fly height control apparatus.

In accordance with another embodiment of the present invention the electrical conductivity path is reversed from that of the previous embodiment. Termination pads 326a and 326b are absent and PZT 260 is electrically coupled to suspension base material 383 at the location of termination pad 326a and 326b. Termination pad 330a is electrically coupled to suspension conductor 385 in a similar manner as termination pad 326a in accordance with the previous embodiment. Termination pad 330b is electrically coupled to PZT 260 via an internal conductor that is coupled to backside 354 of trifurcated slider 350. Typically electrical coupling from backside 354 of trifurcated slider 350 to PZT 260 can be achieved by using a variety of conductive adhesives well known in the industry. Hence by electrically coupling PZT 260 to suspension base material 383 at the location of termination pad 326a and 326b and to suspension conductor 385 through termination pad 330a, a voltage potential can be established for controlling the function of a fly height control apparatus.

With reference now to FIG. 4a and FIG. 4b, and in accordance with another embodiment of the present invention, suspensions conductors 485 of suspension 480 electrically couple magnetic recording transducer 425 (detail 400 of FIG. 4) to a terminus towards the trailing edge of trifurcated slider 350 whereat termination pads 422b and termination pads 424b reside (1 of each pair is visible in detail 400b of FIG. 4b). Termination pads 422b typically electrically couple the write portion of magnetic recording transducer 425 to termination pads 422a of suspension conductor 485, and termination pads 424b typically electrically couple the read portion of magnetic recording transducer 425 to termination pads 424a of suspension conductor 485.

With reference to FIG. 4b and detail 400b, and in accordance with an embodiment of the present invention, PZT 260 is electrically coupled to suspension base material 483. Termination pad 430a is electrically coupled at location 435 to suspension base material 483 using art such as that taught in U.S. Pat. No. 6,700,748. Termination pad 430b is electrically coupled to PZT 260 via an internal conductor that is coupled to backside 454 of trifurcated slider 350. Typically electrical coupling from backside 454 of trifurcated slider 350 to PZT 260 can be achieved by using a variety of conductive adhesives well known in the industry. Hence by electrically coupling PZT 260 at termination pad 430a and at base material 483, a voltage potential can be established for controlling the function of a fly height control apparatus.

With reference to FIGS. 2a, 3a, 3b, and 4b and in accordance with another embodiment of the present invention, termination pads 222a, 226a, and 224a, termination pads 322a, 326a, and 324a, termination pads 422a and 424a; and termination pads 330a, and termination pads 430a are formed in a bent shape. This bent shape provides flexible electrical coupling between trifurcated slider (250, 350); and suspension (280, 380, 480).

Figure 5:
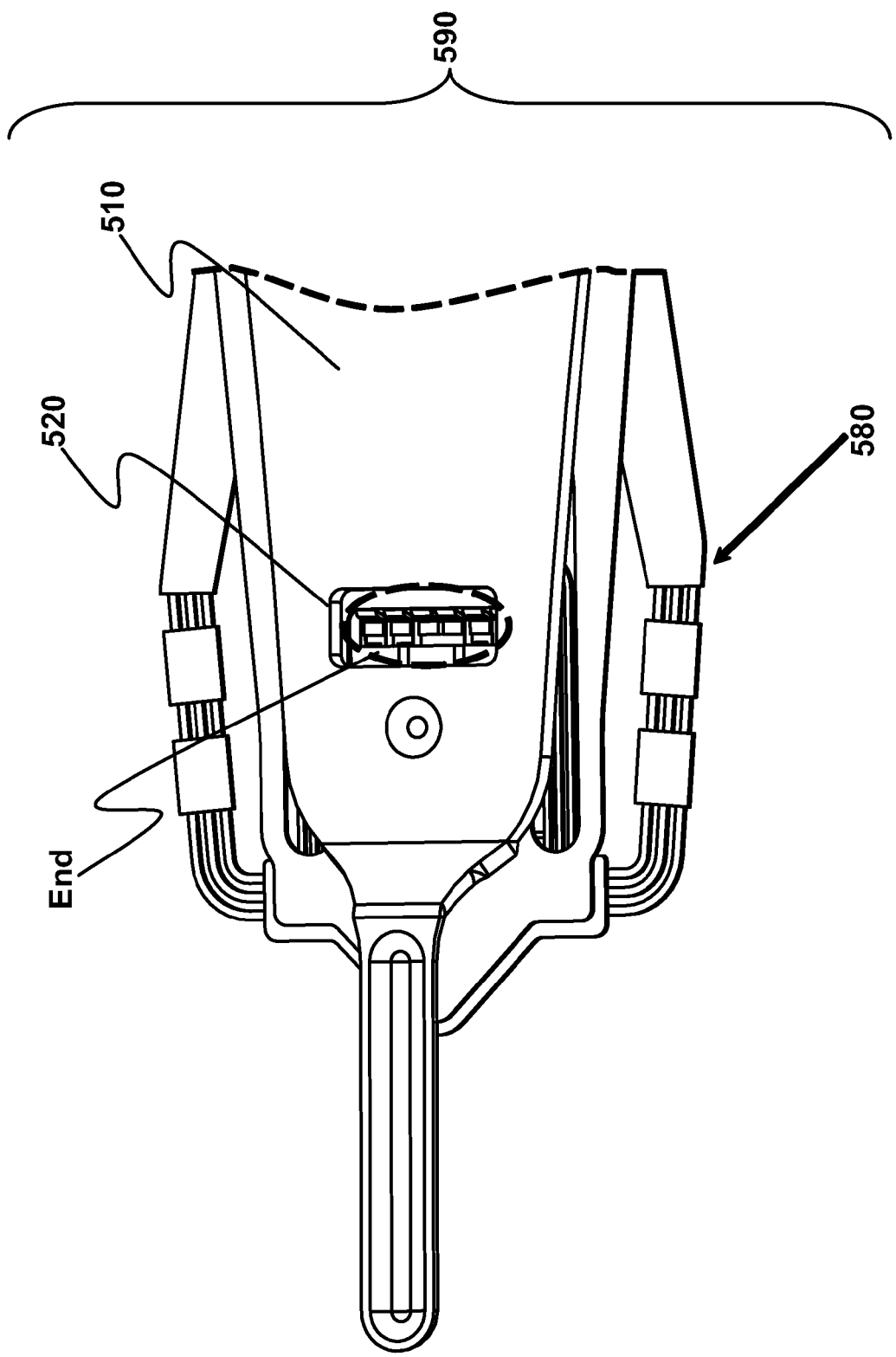
FIG. 5 is an isometric detail of the back of an HGA in accordance with one embodiment of the present invention.

With reference to FIG. 5 and in accordance with an embodiment of the present invention, load beam 510 of HGA 590 is comprised of access hole 520 whereby termination pads 525 of suspension 580 may be accessed for accomplishing electrical coupling of suspension 580 to a PZT. Coupling means known in the industry may comprise, but are not limited to, several metal reflow techniques for effecting the coupling of metals. These techniques are presented as examples only and are not intended to limit the scope of the present invention. Examples of electrical coupling means known in the industry are: laser welding, ultrasonic bonding, conductive epoxy, and solder reflow. Solder reflow may comprise, but is not limited to: reflowing a tinned termination pad, placing a solder preform on the termination pad followed by a reflow process, and placing solder paste on the termination pad followed by a reflow process.

Solder reflow may utilize a number of heat sources for radiating heat through access hole 520. Examples of sources for radiated heat known in the industry are focused infrared light and laser beam. These sources for radiated heat are presented as examples only and are not intended to limit the scope of the present invention.

With reference to FIG. 3b and FIG. 4b and in accordance with an embodiment of the present invention, termination pad 330a and 430a are formed in an S-shape to meet the location of 330b and 430b respectively. The S-shape of terminations pads 330a and 430a further allows termination pads 330a and 430a to deform and absorb any relative motion between trifurcated slider 350 and suspension 380, and relative motion between trifurcated slider 350 and suspension 480. The S-shape of terminations pad 330a and 430a further allows termination pad 330a and 430a to deform and absorb any strain that might be present due to the contraction of the solder during the solder reflow process.

Figure 6:
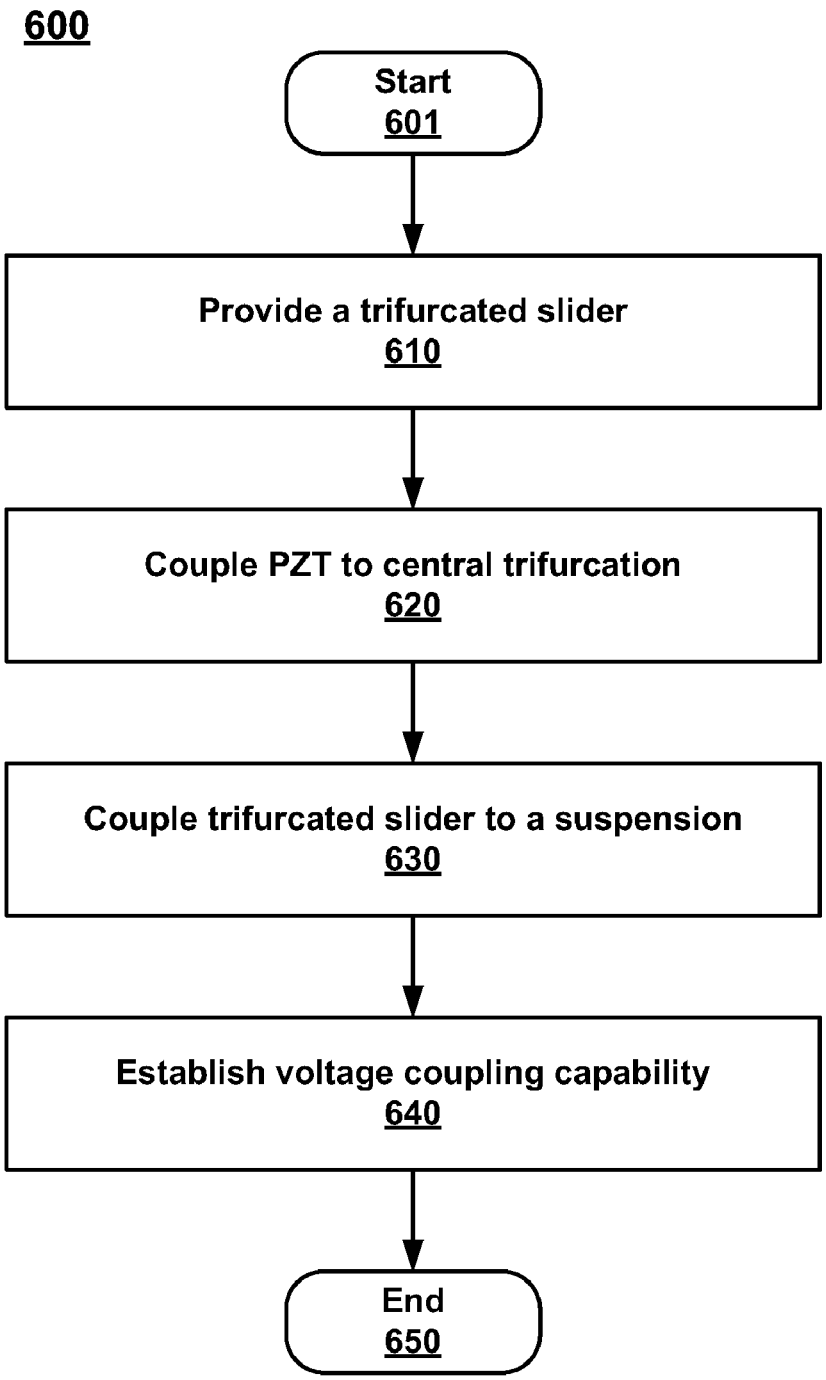
FIG. 6 is a flow chart illustrating steps of a fabrication process for a fly height control apparatus in accordance with one embodiment of the present invention.

FIG. 6 is a flow chart of a process 600 in which particular steps are performed in accordance with an embodiment of the present invention for fabricating a fly height control apparatus suitable for coupling a voltage potential across a PZT thereby displacing a magnetic recording transducer on a trifurcated slider. FIG. 6 includes processes of the present invention, which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in process 600, such steps are exemplary. That is, the present invention is well suited to performing various other steps or variations of the steps recited in FIG. 6. Within the present embodiment, it should be appreciated that the steps of process 600 may be performed by software, by hardware, by an assembly mechanism, through human interaction, or by any combination of software, hardware, assembly mechanism, and human interaction.

Process 600 will be described with reference to elements shown in FIG. 2, FIG. 2*a*, FIG. 3, FIG. 3*a*, FIG. 4, and FIG. 4*a*.

In step 601 of process 600, suitable components such as suspension 280, suspension 380, suspension 480, PZT 260, trifurcated slider 250, trifurcated slider 350, and trifurcated slider 350 are gathered for starting the process 600 in an embodiment of the present invention.

In step 610 of process 600, a prefabricated trifurcated slider such as trifurcated slider 250, trifurcated slider 350, and trifurcated slider 350 is provided for assembly through process 600 in an embodiment of the present invention.

In step 620 of process 600, a piezoelectric transducer such as PZT 260 is coupled to a surface of a central trifurcation of the trifurcated slider provided in step 610, wherein the surface is opposite and parallel to an air bearing surface of the provided trifurcated slider in an embodiment of the present invention.

In step 630 of process 600, in embodiments of the present invention, the trifurcated slider provided in step 610 is coupled to a suspension such as suspension 280, suspension 380, and suspension 480.

In step 640, coupling the trifurcated slider to the suspension establishes voltage coupling capability from the suspension to the piezoelectric transducer whereby applying a voltage potential will displace a magnetic recording transducer on the trifurcated slider.

In one embodiment, in accordance with step 640, a monolithic circuit is deposited on a surface of the central trifurcation of the trifurcated slider provided in step 610, wherein the surface is opposite and parallel to an air bearing surface of the trifurcated slider. Depositing a monolithic circuit is an alternate embodiment of the present invention.

In another embodiment, in accordance with step 640, an interposing interconnection apparatus is coupled on a surface of the piezoelectric transducer, wherein the surface is opposite and parallel to surface of the trifurcated slider provided in step 610. Coupling an interposing interconnection apparatus is in an alternate embodiment of the present invention.

In yet another embodiment, in accordance with step 640, a conductor provided with said suspension is coupled to the piezoelectric transducer. Coupling a conductor provided with the suspension is an alternate embodiment of the present invention.

In step 650 of process 600, process 600 ends resulting in a fly height control apparatus in accordance with an embodiment of the present invention.

Advantageously, the present invention, in the various presented embodiments allows for the fabrication of a fly height control apparatus that reacts quickly to occurrences of fly height variations of the slider. The present invention in the presented embodiments allows the fly height control to occur over a broad range of deviations form the desired fly height. Additional advantage is realized in the embodiments of the present invention in that the magnetic recording transducer can be retracted as well as distended from the plane of the ABS.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A fly height control apparatus for supporting a magnetic recording transducer comprising:
    a trifurcated slider;
    a single piezoelectric transducer which is coupled to a surface of a central trifurcation of said trifurcated slider, wherein said surface is opposite and parallel to an air bearing surface of said trifurcated slider, and wherein said piezoelectric transducer is configured to control the fly height of a magnetic recording transducer coupled with said central trifurcation during a data transfer operation by urging said central trifurcation out of plane of an air bearing surface of said trifurcated slider; and
    an electrical coupling means for coupling said piezoelectric transducer to a suspension, wherein said electrical coupling means comprise:
        at least one suspension conductor provided with said suspension;
        at least one first electrical coupling terminus positioned on a backside surface and leading edge of at least one non-central trifurcation of said trifurcated slider, wherein an internal conductor couples said at least one first electrical coupling terminus with said single piezoelectric transducer;
        at least one second electrical coupling terminus positioned on a suspension base of said suspension and electrically coupled with said at least on first electrical coupling terminus; and
        a flexible suspension conductor of said at least one suspension conductor configured for electrically and flexibly coupling said magnetic recording transducer with said suspension base.

2. The fly height control apparatus of claim 1 wherein said electrical coupling means comprises an electrical coupling terminus on a surface opposite and parallel to an air bearing surface of said trifurcated slider.

3. The fly height control apparatus of claim 1 wherein said electrical coupling means comprises solder reflow whereby said piezoelectric transducer is coupled to said suspension.

4. A hard disk drive comprising:
    a base casting for providing coupling points for components and sub-assemblies of said hard disk drive;
    a motor-hub assembly to which at least one disk is coupled allowing rotation of said disk about an axis approximately perpendicular and centered to said disk, wherein said motor-hub assembly is coupled to said base casting, wherein said disk comprising at least one surface of data tracks;

a magnetic recording transducer for reading and writing said data tracks onto said surface;

a trifurcated slider comprising said magnetic recording transducer coupled with a central trifurcation of said trifurcated slider; and a fly height control apparatus for adjusting said magnetic recording transducer relative to said surface during a data transfer operation by urging said central trifurcation out of plane of an air bearing surface of said trifurcated slider wherein said fly height control apparatus is coupled between said trifurcated slider and a suspension, wherein said fly height control apparatus comprise:

a single piezoelectric transducer which is coupled to said central trifurcation of said trifurcated slider; and an electrical coupling means for coupling said magnetic recording head and said piezoelectric transducer to said suspension, wherein said electrical coupling means comprises:

at least one suspension conductor provided with said suspension;

at least one first electrical coupling terminus positioned on a backside surface and leading edge of at least one non-central trifurcation of said trifurcated slider, wherein an internal conductor couples said at least one first electrical coupling terminus with said single piezoelectric transducer;

at least one second electrical coupling terminus positioned on a suspension base of said suspension and electrically coupled with said at least on first electrical coupling terminus; and a flexible suspension conductor of said at least one suspension conductor configured for electrically and flexibly coupling said magnetic recording transducer with said suspension base.

5. The hard disk drive of claim 4 wherein said electrical coupling means comprises an electrical coupling terminus on a surface opposite and parallel to an air bearing surface of said trifurcated slider.

6. The hard disk drive of claim 4 wherein said electrical coupling means comprises solder reflow.

7. A method for producing a fly height control apparatus, said method comprising:

providing a trifurcated slider;

coupling a single piezoelectric transducer to a surface of a central trifurcation of said trifurcated slider, wherein said surface is opposite and parallel to an air bearing surface of said trifurcated slider, and wherein said piezoelectric transducer is configured to control the fly height of a magnetic recording transducer coupled with said central trifurcation by urging said central trifurcation out of plane of an air bearing surface of said trifurcated slider; and coupling said trifurcated slider to a suspension base of a suspension such that a voltage can be coupled from said suspension to said piezoelectric transducer thereby displacing said magnetic recording transducer on said trifurcated slider during a data transfer operation, wherein said coupling said trifurcated slider to said suspension base comprises:

coupling at least one first electrical coupling terminus positioned on a backside surface and leading edge of at least one non-central trifurcation of said trifurcated slider with at least one second electrical coupling terminus positioned on said suspension base, wherein an internal conductor couples said at least one first electrical coupling terminus with said single piezoelectric transducer, and wherein at least one suspension conductor is provided with said suspension; and flexibly coupling said magnetic recording transducer with said suspension base by a flexible suspension conductor of said at least one suspension conductor.

* * * * *